US009808955B2

(12) United States Patent
Murray

(10) Patent No.: US 9,808,955 B2
(45) Date of Patent: Nov. 7, 2017

(54) LOW ODOR CREOSOTE-BASED COMPOSITIONS AND USES THEREOF

(71) Applicant: Stella-Jones Inc., Saint Laurent (CA)

(72) Inventor: Gordon Murray, North River (CA)

(73) Assignee: Stella-Jones Inc., St. Laurent, Quebec (CA)

( * ) Notice: Subject to any disclaimer, the term of this patent is extended or adjusted under 35 U.S.C. 154(b) by 0 days.

(21) Appl. No.: 15/124,497

(22) PCT Filed: Mar. 3, 2015

(86) PCT No.: PCT/IB2015/051561
§ 371 (c)(1),
(2) Date: Sep. 8, 2016

(87) PCT Pub. No.: WO2015/136410
PCT Pub. Date: Sep. 17, 2015

(65) Prior Publication Data
US 2017/0080595 A1    Mar. 23, 2017

Related U.S. Application Data

(60) Provisional application No. 61/953,476, filed on Mar. 14, 2014.

(51) Int. Cl.
 B27K 3/46  (2006.01)
 B27K 3/08  (2006.01)
 C08L 91/00  (2006.01)
 C08L 97/02  (2006.01)
 B27K 3/50  (2006.01)

(52) U.S. Cl.
 CPC .............. B27K 3/46 (2013.01); B27K 3/08 (2013.01); C08L 91/00 (2013.01); C08L 97/02 (2013.01); B27K 3/50 (2013.01); B27K 2240/20 (2013.01)

(58) Field of Classification Search
 CPC ... B27K 3/46; B27K 3/08; B27K 3/34; B27K 2240/20; A61L 2/00; A61L 9/00
 USPC ...................................... 428/537.1
 See application file for complete search history.

(56) References Cited

U.S. PATENT DOCUMENTS

| | | | |
|---|---|---|---|
| 2,051,486 A | 8/1936 | Kautter et al. | |
| 3,518,348 A | 6/1970 | Dulat | |
| 3,600,408 A * | 8/1971 | Busack | A01N 31/10 106/2 |
| 4,051,282 A | 9/1977 | Davies | |
| 4,234,665 A * | 11/1980 | Johnston | B27K 3/36 106/18.32 |
| 4,461,721 A | 7/1984 | Goettsche et al. | |
| 5,078,912 A | 1/1992 | Goettsche et al. | |
| 5,080,935 A | 1/1992 | Kelso, Jr. et al. | |
| 5,098,472 A | 3/1992 | Watkins et al. | |
| 5,246,652 A | 9/1993 | Hsu et al. | |
| 5,447,686 A | 9/1995 | Seidner | |
| 5,709,821 A | 1/1998 | Von Bonin et al. | |
| 6,953,501 B2 | 10/2005 | Kelley et al. | |
| 2003/0121445 A1 * | 7/2003 | Herbert, Jr. | B27K 3/15 106/16 |
| 2003/0213400 A1 | 11/2003 | Thompson | |
| 2004/0028934 A1 | 2/2004 | Preston et al. | |
| 2005/0013939 A1 | 1/2005 | Vinden et al. | |
| 2005/0186352 A1 | 8/2005 | Hutter et al. | |
| 2007/0151476 A1 | 7/2007 | Humar et al. | |
| 2010/0297204 A1 | 11/2010 | Uhr et al. | |
| 2011/0039031 A1 | 2/2011 | Cobham et al. | |
| 2012/0171504 A1 * | 7/2012 | Murray | B27K 3/0285 428/537.1 |
| 2014/0342172 A1 * | 11/2014 | Murray | A01N 31/10 428/537.1 |
| 2016/0000090 A1 * | 1/2016 | Murray | C08L 95/00 428/537.1 |

FOREIGN PATENT DOCUMENTS

| | | | |
|---|---|---|---|
| CA | 1306663 | * | 8/1992 |
| CA | 2726795 | | 7/2012 |
| GB | 0 249 698 | | 4/1926 |
| WO | WO-2009/129587 | | 10/2009 |
| WO | WO2014/140854 | * | 9/2014 |
| WO | WO-2014/140854 | | 9/2014 |

OTHER PUBLICATIONS

International Search Report and Written Opinion regarding International Appl. No. PCT/IB2014/001005, dated Sep. 2, 2014, 8 pages.
International Search Report and Written Opinion regarding International Appl. No. PCT/IB2015/051561, dated Jun. 25, 2015, 9 pages.
Ohio Department of Agriculture, Wood Preservation—Category 4b, Study Guide for Commercial Applicators, Ohio Department of Agriculture Publication for Pesticide Regulation, Aug. 2003, 59 pages.
Webb et al., 1958 Cooperative Creosote Project-XIV: 35 Years of Field Experience with Posts, AWPA Proceedings, 1995, vol. 91, pp. 120-125.

* cited by examiner

*Primary Examiner* — Leszek Kiliman
(74) *Attorney, Agent, or Firm* — Foley & Lardner LLP

(57) ABSTRACT

Provided is a wood treatment composition comprising a reaction product produced by reacting a mixture, which includes creosote and a fatty ester component, in the presence of a Lewis acid catalyst. The reaction mixture may optionally include bunker oil and/or a borate ester. The mixture may comprise i) at least about 85 wt % creosote; and ii) at least about 1 wt % of an ester component containing one or more $C_8$-$C_{50}$ fatty esters. Also provided are wood treated with the composition and methods for using the composition to treat wood.

25 Claims, No Drawings

LOW ODOR CREOSOTE-BASED COMPOSITIONS AND USES THEREOF

BACKGROUND

Wood products have been used as utility poles, railway ties, and construction materials in a wide variety of industries. Without proper treatment, wood products deteriorate and are susceptible to weathering, insects (e.g., termites, carpenter ants, and beetles), marine borers (e.g., mollusks and crustaceans), bacteria, and fungi (e.g., stains, white rot, soft rot, and brown rot). Wood treatment is required to prevent these problems and more effective wood treatment compositions are needed.

Preservatives used to treat wood, such as creosote are effective at preserving wood, but may emit naphthalene and other volatile organic compounds (VOCs) that are associated with petroleum and coal tar distillates. Some of these volatile compounds are toxic and/or have unpleasant odors. In particular, these VOCs are both a health risk and a nuisance for the plants using creosote.

During wood-treatment processes, creosote-based preservatives are brought to elevated temperatures and the VOCs are released to the atmosphere. Consequently, many plants are required to install expensive air scrubbers and incineration units which have a high capital cost. Further, the sequestered VOCs must be contained and disposed, further adding to production costs and potential hazards.

The VOCs also tend to persist in the treated wood products and off-gas from the wood products over time. This gradual emission of VOCs from treated wood yields unpleasant odors that are not suitable for populated areas. As such, more active and effective odor suppressants are needed. The discovery of more active odor suppressants will yield wood preservative compositions that are more concentrated in creosote without the unacceptably high levels of odors and VOCs that are currently attributed to these chemicals.

SUMMARY

The present application provides creosote-based wood treatment products having low odor characteristics. In many embodiments of the present wood treatment products, the levels of VOCs and, in particular naphthalene, emitted into the atmosphere by the products is substantially less than conventional creosote-based wood treatment products. Wood products, such as utility poles and railroad ties, that are treated with the compositions described herein, exhibit little odor and emit a substantially reduced quantity of VOCs throughout the lifespan of the wood product in comparison to the creosote-based wood treatment products that are currently commercially available.

The present creosote-based wood treatment products are produced by forming a mixture including creosote and one or more $C_8$-$C_{50}$ fatty esters and reacting the mixture in the presence of an appropriate catalyst, e.g., a Lewis acid catalyst, to form a low odor creosote-based wood treatment product. These low odor creosote-based products may exhibit a headspace VOC concentration at 70° C. of no more than about 100 ug/m$^3$. These low odor creosote-based products may also be characterized by a headspace naphthalene concentration at 70° C. of no more than about 10 ug/m$^3$ (desirably no more than about 5 ug/m$^3$ and more suitably no more than about 1 ug/m$^3$ naphthalene at 70° C.).

The creosote-containing composition must include enough of the $C_8$-$C_{50}$ fatty esters and catalyst to reduce the odor of creosote, without having too much of the $C_8$-$C_{50}$ fatty esters to reduce the viscosity of the composition to levels that cause the composition to leach from the wood, once treated. Thus, an additional advantage of the compositions described herein is that they effectively remain in the wood upon treatment and substantially resist leaching from the wood.

The creosote-based wood treatment products desirably may remain as a substantially homogenous solution at a temperature of about 15° C. to about 35° C. for up to one month or longer. Typically, the creosote-based wood treatment products have an open-cup flashpoint of at least about 65° C.

The present creosote-based wood treatment products may be used to treat wood by employing a method which includes the steps of (a) immersing a wood piece in the wood treatment product; and (b) pressure impregnating the immersed wood above 1 atm (absolute) (≥101 kPa (absolute)), typically under a pressure of at least about 2 atm (gauge) (≥203 kPa (gauge); at least about 30 psig) and more commonly under a pressure of at least about 5 atm (gauge) (≥507 kPa (gauge); at least about 73 psig). The method may further include (c) separating the wood from the treatment solution after the pressure impregnation. Quite commonly after removal of the treatment solution, the pressure impregnated wood may be exposed to an expansion bath and/or exposing the wood to a vacuum below 1 atm-absolute atm (101 kPa-absolute) and, quite commonly to a vacuum of below about 0.5 atm-absolute (50 kPa-absolute) after completion of the expansion bath exposure.

The reaction of the creosote with the fatty esters may be carried out prior to treatment of wood with the creosote-based product. In other instances, the reaction of these components to lower the odor emission characteristics may occur during the course of treating wood with the mixture. For example, wood may be treated with a treatment solution that includes creosote, one or more $C_8$-$C_{50}$ fatty esters and a suitable catalyst, such as a Lewis acid catalyst. The initial stages of the treatment typically include impregnating the wood with this mixture under elevated temperature and/or pressure conditions. For example, the wood may be immersed in the creosote-based mixture and pressure impregnated under a pressure of at least about 2 atm-g (203 kPa-g) and a temperature of at least about 120° F. (~50° C.). Under such conditions in the presence of the catalyst, the fatty esters may react with components of the creosote to lower the odor emission characteristics of the treatment mixture.

In many embodiments, the present creosote-based products include at least about 85 wt % creosote. The creosote is suitably reacted in a reaction mixture, which includes at least about 1 wt % of an ester component containing the $C_8$-$C_{50}$ fatty ester(s) and typically may contain about 2 to 10 wt % of the fatty esters. In some embodiments, the amount of the $C_8$-$C_{50}$ fatty ester(s) in the reaction mixture may be higher, e.g., up to about 15 wt % fatty ester(s) based on the total weight of the reaction mixture.

In some embodiments, the compositions described herein may further comprises a borate compound. In some embodiments, the borate compound includes an ester of boric acid, such as a monoethanolamine ester of boric acid. The borate compound may suitably include boric acid, a boric acid salt (such as an alkali metal salt of boric acid) and/or sodium octaborate. For example, in one suitable embodiment, the borate compound may include an ester of boric acid, such as a monoethanolamine ester of boric acid, in addition to boric acid.

Further embodiments include the wood that is treated with any of the creosote-based wood treatment compositions disclosed herein. The wood can be used, for example, as a utility pole or railroad tie.

Still further embodiments include methods for treating wood with any of the creosote-based wood treatment compositions disclosed herein.

DETAILED DESCRIPTION

Wood Treatment Compositions

The disclosed wood treatment compositions include creosote. Creosote is a distillate obtained from tars produced from the carbonization of bituminous coal and is a mixture of over three hundred chemicals such as polycyclic aromatic hydrocarbons (PAHs), phenol and cresols created by high temperature treatment of coal. Creosote is commonly used as a biocide to coat wood and protect it from soft rot fungi and to prevent leaching of boron from the interior.

Biodiesel has been used as an additive in creosote-containing compositions for the treatment of wood. However, such preservative formulations generally require significant quantities of biodiesel to yield appreciable reductions in odor. For example, in some existing creosote-based wood preservative formulations, blending up to 45 wt/wt % biodiesel is necessary to reduce the odor of these formulations to acceptable levels. Biodiesel is predominantly a mixture of saturated and unsaturated $C_{10}$-$C_{22}$ hydrocarbons, other natural products and processing byproducts. Significant quantities of biodiesel can lower the viscosity and specific gravity of creosote, which can cause the creosote-based composition to leach from wood that has been treated with the composition. This is particularly problematic for a treated utility pole that will begin leaching significant amounts of the wood treatment composition into the ground once it is installed upright.

Significant quantities of biodiesel can also dilute the efficacy of creosote-based wood preservative formulations and compromise the ability of creosote to (a) seal the wood and act as a physical barrier between the atmosphere and the interior of the wood and (b) impart load carrying enhancements to the treated wood structure. In other words, a railroad tie treated with pure creosote will generally have a higher load-carrying ability than a similar tie treated with creosote diluted with biodiesel. The creosote diluted with significant amounts of biodiesel or other solvent has a lower viscosity and specific gravity.

It has now been discovered that the reaction of low levels of $C_8$-$C_{50}$ fatty esters with creosote in the presence of an appropriate catalyst, such as a Lewis acid catalyst, can be remarkably effective at reducing the concentration of VOCs in creosote-based wood preservative formulations and reduce the odor emitted by the formulation. The Lewis-acid catalyzed reaction of the creosote with the fatty esters effectively reduces the VOCs of the creosote-based compositions described herein and thus reduces the odor of the compositions described herein.

Because the reaction of relatively low levels of $C_8$-$C_{50}$ fatty esters can substantially reduce the level of VOCs in creosote-based wood preservative formulations and reduce odor, the resulting creosote-based formulation remains sufficiently viscous to remain within the wood that is treated. This attribute allows wood treated with the present compositions to resist or minimize leaching, remain sealed from the atmosphere by the composition, and attain desired load carrying attributes.

In some embodiments the viscosity of the composition is at least about 4 mm2/s at 40° C. and, commonly about 4-14 mm$^2$/s at 40° C. (unless otherwise indicated, viscosity values disclosed herein are determined by ASTM D-445). In some embodiments the density of the composition is about 1.00-1.17 g/cm$^3$ at 25° C. In one embodiment, the present creosote-based compositions have a specific gravity of not less than 1.080 at 38° C., when compared to water at 15.5° C. as determined by standard method ASTM D-287.

As noted, the present application provides creosote-based wood treatment products having low odor characteristics. In some embodiments, a wood treatment composition is provided where the composition includes a reaction product produced by reacting a mixture in the presence of a Lewis acid catalyst, wherein the mixture comprises i) at least about 85 wt % creosote; and ii) at least about 1 wt % of an ester component containing one or more $C_8$-$C_{50}$ fatty esters.

In some embodiments, the any of the creosote-containing compositions has about 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt % of the creosote. In any of the above embodiments, the creosote can be combined with any one or more of the $C_8$-$C_{50}$ fatty esters and any one or more Lewis acid catalysts.

The creosote-based compositions described herein include one or more $C_8$-$C_{50}$ fatty esters. In some embodiments, the composition comprises 1-30 wt %, 1-20 wt %, 1-10 wt %, 1-8 wt %, 1-5 wt % of the one or more $C_8$-$C_{50}$ fatty esters. In some embodiments, the composition comprises 1, 2, 3, 4, 5, 6, 7, 8, 9, 10, 11, 12, 13, 14, 15, 16, 17, 18, 19 or 20 wt % of the one or more $C_8$-$C_{50}$ fatty esters exemplified herein.

In some embodiments, the fatty ester includes any combination of saturated and/or unsaturated esters of fatty acids. In some embodiments, the unsaturated esters of fatty acids may include one or more of Omega-3 fatty acids, Omega-6 fatty acids, Omega-9 fatty acids, dimeric unsaturated fatty acids, esters of: myristoleic acid, oleic acid, palmitoleic acid, (trans) vaccenic acid, hexadecatrienoic acid, linoleic acid, α-linolenic acid, β-linolenic acid, γ-linolenic acid, stearidonic acid, eicosatrienoic acid, eicosatetraenoic acid, eicosapentenoic acid, heneicosapentenoic acid, docosapentenoic acid, docosahexaenoic acid, tetracosapentenoic acid, tetracosahexaenoic acid, sapienic acid, elaidic acid, linoelaidic acid, α-eleostearic acid, β-eleostearic acid, arachidonic acid, or erucic acid, (Z)-9-((E)-non-3-enyl)-10-((E)-non-3-enylidene)octadecanedioic acid; (E)-8,8'-(5-hexyl-6-(oct-2-enyl)cyclohex-3-ene-1,2-diyl)dioctanoic acid; 8,8'-(6-butyl-7-hexyl-1,2,4a,5,6,7-hexahydronaphthalene-1,2-diyl) dioctanoic acid.

In some embodiments, the fatty ester component includes an ester of an unsaturated fatty acid that is one or more of oleic acid, linoleic acid, linolenic acid and arachidonic acid. In some embodiments, the unsaturated fatty ester includes an ester of linoleic acid.

In some embodiments, the fatty ester component includes an ester of a fatty acid that is one or more of dodecanoic acid, behenic acid, myristic acid, stearic acid and palmitic acid.

In some embodiments, the fatty esters include one or more of the methyl and/or ethyl esters of lauric acid, myristic acid, palmitic acid, oleic acid, stearic acid, linoleic acid and capric acid. In some embodiments, the fatty esters include methyl laurate (about 54 wt %), and the methyl esters of myristic acid (22%), palmitic acid (11 wt %), oleic acid (8 wt %), stearic acid (3 wt %), linoleic acid (1 wt %) and capric acid (0.5 wt %). Other suitable fatty ester components may include at least about 80 wt % and, often, at least about 90 wt % of a mixtures of esters (e.g., methyl and/or ethyl esters) of lauric acid, myristic acid, palmitic acid, and/or stearic acid.

In some embodiments, the fatty ester component may include a substantial amount of esters of saturated fatty acids. For example, the fatty ester component may include at least about 50 wt % esters of saturated fatty acids, which are typically $C_1$-$C_6$ alkyl ester(s) of one or more $C_{12}$-$C_{18}$ saturated fatty acids. Such ester components may suitable include alkyl esters of fatty acid derived from palm kernel oil, coconut oil and/or palm oil or fractionated components thereof. One suitable fatty ester mixture is includes at least about 50 wt % and, commonly at least about 80 wt % or 90 wt % palm kernel oil FAME, coconut oil FAME and/or palm oil FAME.

In some embodiments, the $C_8$-$C_{50}$ fatty esters consist essentially of esters of the fatty acids recited in any of the embodiments of the composition described herein.

In some embodiments, the fatty ester is a $C_1$-$C_6$ alkyl ester. For example, the fatty ester is a methyl and/or ethyl ester. In some embodiments, the fatty ester may include a mono-glyceride, di-glyceride and/or tri-glyceride.

The quantity of the reaction product in the composition may vary depending on a variety of factors, such as the chemical composition of the creosote component, the amount of naphthalene and total VOC in the creosote, the type of fatty ester employed and the like. In some embodiments, the low odor composition may include at least about 0.1 wt % and typically no more than about 15 wt %, 12 wt %, 10 wt %, or 5 wt % of the reaction product.

In some embodiments, the mixture is reacted in the presence of the Lewis acid catalyst at an increased pressure of greater than 1 atm-absolute (101.325 kPa) and/or a reduced pressure of less than 1 atm-absolute. In some embodiments, the mixture is reacted in the presence of the Lewis acid catalyst at an increased pressure of greater than 1 atm-absolute and subsequently subjected to a reduced pressure of less than 1 atm-absolute. For example, the composition may be subjected to an increased pressure of at least about 1, 2, 3, 5, 7, 10, 15 or 25 atm-gauge and/or an increased pressure between any two of these amounts, and a reduced pressure of no more than about 0.5, 0.3, 0.2, 0.1, or 0.05 atm-absolute, or a decreased pressure between any two of these values.

The mixture may be reacted with heating. For example, in some embodiments, the mixture is reacted in the presence of the Lewis acid catalyst at a temperature of at least about 100° F. (~38° C.), 120° F. (~50° C.), 150° F. (~65° C.), 180° F. (~82° C.), 200° F. (~93° C.), or a temperature between any two of these values.

An exemplary odor-reducing formulation can be made from creosote or a mixture of creosote and bunker oil, e.g., a mixture including at least about 40 wt % creosote and at least about 40 wt % bunker oil. For example, one suitable mixture may include approximately 50 wt % creosote and 50 wt % bunker oil (i.e., fuel oil) blended with 1-10 wt % of a fatty ester component, such as one or more saturated and/or unsaturated fatty acid methyl esters, e.g., a mixture of linolenic, linoleic, lauric acid, myristic acid, palmitic acid, oleic acid, stearic acid and capric acid and about 0.001-5 wt % catalyst. In some embodiments, the 1-10 wt % fatty esters include methyl laurate (about 54 wt %), and the methyl esters of myristic acid (22%), palmitic acid (11 wt %), oleic acid (8 wt %), stearic acid (3 wt %), linoleic acid (1 wt %) and capric acid (0.5 wt %). Other suitable fatty ester mixtures may include at least about 80 wt % and, often, at least about 90 wt % of a mixtures of esters (e.g., methyl and/or ethyl esters) of lauric acid, myristic acid, palmitic acid, and/or stearic acid.

In some embodiments, the choice and quantity of fatty esters depends in part on the type of creosote used and the type of wood to be treated. For example, creosotes having a high concentration of VOCs and/or wood from trees, such as gum trees, having a high concentration of chemical species that can be extracted from the wood, may be blended with a relatively high ratio e.g., 4-10 wt % of fatty esters. Creosotes having a relatively low concentration of VOCs and/or wood from trees, such as certain species of maple, having a relatively low concentration of chemical species that can be extracted from the wood, may be blended with a relatively low ratio e.g., 1-3 wt % of fatty esters.

As noted, many embodiments of the present wood treatment compositions, emit levels of volatile organic compounds ("VOCs") and, in particular naphthalene, into the atmosphere that are substantially less than levels emitted by conventional creosote-based wood treatment products or by the raw creosote starting-material. The compositions may be reacted or stored in a closed container having a volume of the composition beneath a headspace of atmosphere, such as air. The quantity of VOCs in a closed container that includes the disclosed compositions beneath a headspace of atmosphere can be measured.

For example, in some embodiments, the composition generally has a "headspace volatile organic compounds (VOC) concentration" (also referred to herein as "headspace VOC concentration") of no more than about 200 $\mu g/m^3$, 150 $\mu g/m^3$, 100 $\mu g/m^3$, 50 $\mu g/m^3$, 10 $\mu g/m^3$, 10 $\mu g/m^3$ or 5 $\mu g/m^3$, or a concentration between any two of these values, where $\mu g/m^3$ refers to μg VOCs/$m^3$ atmosphere. In some embodiments, the composition generally has a headspace VOC concentration of no more than about 200 $\mu g/m^3$, 150 $\mu g/m^3$, 100 $\mu g/m^3$, 50 $\mu g/m^3$, 10 $\mu g/m^3$, 10 $\mu g/m^3$ or 5 $\mu g/m^3$, within one day, two days, five days or ten days of the reaction product being produced. In some embodiments, the headspace volatile organic compounds (VOC) concentration is measured at 70° C., 100° C., 120° C., 150° C., or a temperature between any two of these values. In one embodiment, the composition may have a headspace VOC concentration at 70° C. of no more than about 10 $\mu g/m^3$.

As used herein, the term "headspace VOC concentration" refers to the concentration of volatile organic compounds emitted by a liquid material at the indicated temperature as determined by the following procedure. A closed container is filled to 10-95 vol % capacity with the creosote-based product described herein (or other liquid product potentially containing volatile organic compounds) and the system is allowed to equilibrate at 70° C. (or other indicated temperature) for at least 10 minutes. A 10 cc gas sample is removed from the headspace above the liquid product in the closed container and the concentration of volatile organic compounds in the 10 cc gas sample is determined by standard analytical methodology, e.g., via gas chromatographic analysis (e.g., using EPA method 5021A, EPA 8240 or modifications thereof). As used herein, the term "headspace naphthalene concentration" refers to the concentration of naphthalene emitted by a liquid material as determined by following a similar procedure. A closed container is filled to 10-95 vol % capacity with the liquid material to be tested and the system is allowed to equilibrate at 70° C. (or other indicated temperature) for at least 10 minutes. A 10 cc gas sample is removed from the headspace above the liquid product in the closed container and the concentration of naphthalene in the 10 cc gas sample is determined by standard analytical methodology.

In other embodiments, the composition has a "headspace naphthalene concentration" at 70° C. of no more than about 200 µg/m$^3$, 150 µg/m$^3$, 100 µg/m$^3$, 50 µg/m$^3$, 10 µg/m$^3$, 10 µg/m$^3$ or 5 µg/m$^3$, or a concentration between any two of these values, where µg/m$^3$ refers to µg naphthalene/m$^3$ atmosphere. In some embodiments, the composition generally has a headspace naphthalene concentration of no more than about 200 µg/m$^3$, 150 µg/m$^3$, 100 µg/m$^3$, 50 µg/m$^3$, 20 µg/m$^3$, 10 µg/m$^3$ or 5 µg/m$^3$, within one day, two days, five days or ten days of the reaction product being produced. In some embodiments, the present creosote-based composition may have a headspace naphthalene concentration at 70° C. of no more than about 2 µg/m$^3$ and, desirably, no more than about 1 µg/m$^3$.

In further embodiments, the creosote of the composition exhibits an odor before mixing that is substantially reduced after the reaction product is formed. The odor may include, for example, an odor of creosote or more particularly, an odor of naphthalene. In some embodiments, the composition emits an odor (e.g., of creosote and/or naphthalene) before mixing that is substantially reduced after the reaction product is formed.

As noted, the composition includes $C_8$-$C_{50}$ fatty esters. In some embodiments, the $C_8$-$C_{50}$ fatty esters include $C_{10}$-$C_{22}$ fatty acid alkyl esters. For example, the ester component may comprise at least about 50 wt % $C_{10}$-$C_{22}$ saturated fatty acid alkyl esters. Alternatively, the ester component comprises at least about 70 wt % $C_{10}$-$C_{16}$ saturated fatty acid methyl esters. In some embodiments, the ester component comprises at least about 90 wt % methyl esters of capric acid, lauric acid, myristic acid, palmitic acid, stearic acid and/or oleic acid.

The composition includes a Lewis acid catalyst. Suitable Lewis acid catalysts include those that are commonly used as Lewis acid catalysts in a Friedel-Crafts acylation reaction, as described in March's Advanced Organic Chemistry, M. B. Smith, Ed., 7$^{th}$ Edition, 2013, John Wiley & Sons. In some embodiments, the Lewis acid catalyst comprises one or more of an acidic clay, zeolite, aromatic sulfonic acid, polyphosphoric acid, zinc, zinc salt, iron, iron salt, aluminum trihalide, boron trihalide or iodine. In other embodiments, the Lewis acid catalyst comprises zinc chloride, ferric chloride or a mixture thereof.

The Lewis acid may comprise zeolites. Zeolites are the aluminosilicate members of the family of microporous solids known as "molecular sieves." There are also several types of synthetic zeolites that form by sol-gel processing i.e., a slow crystallization of a silica-alumina gel in the presence of alkalis and organic templates. In some embodiments, the zeolites used herein include any natural or synthetic zeolite, most desirably those that are widely used as catalysts in the petrochemical industry. Some of the more common mineral zeolites are analcime, chabazite, clinoptilolite, heulandite, natrolite, phillipsite, and stilbite. For example, in some embodiments of the composition, the Lewis acid comprises a porous crystalline zeolite containing hydrated cations, e.g., Na$^-$, K$^+$, Ca$^{2+}$, Mg$^{2+}$ and others.

Without being bound by theory, it has been observed in some instances that use of a catalyst to prepare the compositions described herein facilitates a reaction between components of the creosote and the fatty esters. For example, the use of about 0.0001-5 wt % catalyst generally results in a composition having reduced odor properties (as characterized by reduced levels of naphthalene and/or total VOC emissions). As such, use of the catalyst typically yields odor-suppressing compositions that require less of the fatty esters to be effective. In many suitable embodiments, the reaction mixture may include about 0.0001-0.05 wt % of a catalyst, such as a Lewis acid catalyst. For example, the reaction mixture may include about 0.0001-0.01 wt % of zinc, zinc salt, iron and/or iron salt as the catalyst.

In some embodiments, the creosote can be combined and reacted with any of the fatty esters described herein and any of the borates or esters of boric acid described herein. Thus, in some embodiments of the composition, the mixture further comprises at least about 1 wt % of a borate or borate ester. The composition may comprise at least about 90 wt % of the reaction product; and further include the borate ester. For example, the composition may include at least about 2, 3, 4, 5, 6, 7, 8, 9, 10, 11 or 12, 13, 14 or 15 wt % of the borate or borate ester.

Borate compounds (i.e., borates) contain oxoanions of boron in a +3 oxidation state. The simplest borate ion, $BO_3^{3-}$, and its acidic counterpart, boric acid $B(OH)_3$, have trigonal planar structures. Other borates include trigonal $BO_3$ or tetrahedral $BO_4$ structural units, sharing oxygen atoms. A number of polymeric borate ions are known. They may be made by reacting $B(OH)_3$ or $B_2O_3$ with metal oxides. Examples include: diborate $B_2O_5^{4-}$ (e.g., $Mg_2B_2O_5$), triborate $B_3O_7^{5-}$ (e.g., $CaAlB_3O_7$), tetraborate $B_4O_9^{6-}$ (e.g., sodium tetraborate $Na_2B_4O_7 \cdot 10H_2O$), pentaborate $B_5O_6(OH)_4^-$ (e.g., sodium pentaborate $Na[B_5O_6(OH)_4] \cdot 3H_2O$), and octaborate (e.g., disodium octaborate tetrahydrate, Tim-Bor, $Na_2B_8O_{13} \cdot 4H_2O$).

Borates, such as octaborate, are broad spectrum insecticides commonly used in the treatment of wood. They have the advantage of being readily diffusible into the interior of wood and exhibit low mammalian toxicity. Solid rods of boric acid, for example, are driven into the base of previously installed utility poles to prolong the life of the pole. Once inserted, the boric acid diffuses into the interior of the pole to protect the base region of the pole. However, the installation of boric acid rods is costly and labor intensive because trenches must be dug around the poles, the base must be drilled, and the rods inserted. Replacement boric acid rods must then be reinserted numerous times during the lifetime of the pole. Further, borates are susceptible to leaching and may not adequately protect against soft rot fungi.

In certain embodiments, the any of the compositions described herein has about 0.01 wt % to about 75 wt % of the ester of boric acid. In certain embodiments, the composition has about 0.01 wt % to about 25 wt % of the ester of boric acid. In certain embodiments, the composition has about 1 wt % to about 15 wt % of the ester of boric acid. In other embodiments, the composition has about 1 wt % to about 5 wt % of the ester of boric acid. In certain embodiments, the composition has about 5 wt % of the ester of boric acid. In other embodiments, the composition has about 4 wt % of the ester of boric acid. In certain embodiments, the composition has about 3 wt % of the ester of boric acid. In other embodiments, the composition has about 2 wt % of the ester of boric acid. In certain embodiments, the composition has about 1 wt % of the ester of boric acid. In certain embodiments, the composition has about 0.01 wt % to about 1 wt % of the ester of boric acid. Unless indicated otherwise, all percentages provided throughout this specification are weight percentages (e.g., wt % or w/w %).

A wide variety of esters of boric acid may be used in any of the present compositions, including but not limited to alkanol, alkenol, alkanolamine esters and mixtures of any two or more. For example, in some embodiments, the ester of boric acid is a $C_1$-$C_{22}$ alkanol ester of boric acid. In certain embodiments, the ester of boric acid is a $C_1$-$C_{12}$ alkanol ester of boric acid. In certain embodiments, the ester of boric acid is a $C_1$-$C_6$ alkanol ester of boric acid. In certain embodiments, the ester of boric acid is a straight chain $C_1$-$C_{22}$ alkanol ester of boric acid. In certain embodiments, the ester of boric acid is a branched $C_1$-$C_{22}$ alkanol ester of boric acid. In certain embodiments, the ester of boric acid is a $C_2$-$C_{22}$ alkenol ester of boric acid. In certain embodiments, the ester of boric acid is a $C_2$-$C_{12}$ alkenol ester of boric acid. In certain embodiments, the ester of boric acid is a $C_2$-$C_6$ alkenol ester of boric acid. In certain embodiments, the ester of boric acid is a monoalkanolamine ester of boric acid. Such an ester of boric acid may be prepared, e.g, from a reaction mixture of about 40 wt % to about 80 wt % boric acid, $C_1$-$C_6$ monoalkanolamine, and water.

In certain embodiments, the composition comprising an ester of boric acid in a creosote/unsaturated fatty ester blend is substantially anhydrous. In certain embodiments, the ester of boric acid is substantially anhydrous. In certain embodiments, substantially anhydrous means less than 5 wt % water. In other embodiments, substantially anhydrous means less than 4 wt % water. In certain embodiments, substantially anhydrous means less than 3 wt % water. In other embodiments, substantially anhydrous means less than 2 wt % water. In certain embodiments, substantially anhydrous means less than 1 wt % water. In other embodiments, substantially anhydrous means less than 0.5 wt % water. In certain embodiments, substantially anhydrous means less than 0.1 wt % water. In other embodiments, substantially anhydrous means less than 0.01 wt % water.

In any of the compositions of the present technology, the ester of boric acid may be a monoester, diester, trimester or a mixture of any two or more thereof. For example, a $C_1$-$C_6$ monoalkanolamine ester of boric acid can be a monoester of boric acid, a diester of boric acid, a triester of boric acid or a mixture of any two or more of the foregoing. In certain embodiments, the $C_1$-$C_6$ monoalkanolamine ester is a monoethanolamine ester of boric acid. A $C_1$-$C_6$ monoalkanolamine ester of boric acid is also referred to herein as a "Borate Ester" and comprises any one of the mono, di or tri esters and/or mixtures thereof. In certain embodiments, the monoethanolamine ester of boric acid is prepared and is referred to herein as the "MBE Ester" or "MBE."

The $C_1$-$C_6$ monoalkanolamine ester (e.g., a monoethanolamine or MBE ester of boric acid) is prepared by mixing $C_1$-$C_6$ monoalkanolamine (e.g., monoethanolamine) in an aqueous solution of boric acid and allowing the $C_1$-$C_6$ monoalkanolamine (e.g., monoethanolamine) to react with the boric acid.

The concentration of $C_1$-$C_6$ monoalkanolamine (e.g., monoethanolamine) in the reaction mixture is about 2 wt % to about 43 wt %; the concentration of water in the reaction mixture is about 2 wt % to about 27 wt %; and the concentration of boric acid in the reaction mixture is about 20 wt % to about 80 wt %. Alternatively, the concentration of $C_1$-$C_6$ monoalkanolamine (e.g., monoethanolamine) in the reaction mixture is about 28 wt % to about 38 wt %; the concentration of water in the reaction mixture is about 12 wt % to about 22 wt %; and the concentration of boric acid in the reaction mixture is about 45 wt % to about 70 wt %. In yet another embodiment, the concentration of boric acid in the reaction mixture is about 48 wt % to about 66 wt % with the remainder of the mixture being $C_1$-$C_6$ monoalkanolamine and water, where the wt % of the $C_1$-$C_6$ monoalkanolamine is approximately twice the wt % of the water. The quantity of $C_1$-$C_6$ monoalkanolamine (e.g., monoethanolamine) in the reaction mixture relative to boric acid can be adjusted upward, resulting in greater amounts of di and triester; or downwards, resulting in lesser amounts of di and triester. Because the reaction is exothermic, in certain embodiments, the esterification reaction of boric acid is carried out with cooling. In some embodiments, water is substantially absent from the treatment solution used in the pressure impregnation step. Thus, in certain embodiments, as much water as possible is evaporated away due to the heat that is generated from the exotherm that occurs during the esterification reaction. In some embodiments, the treatment solution used in the pressure impregnation step has greater than or equal to 5 wt % water. In some embodiments, the treatment solution used in the pressure impregnation step has less than 5 wt % water. In some embodiments, the treatment solution used in the pressure impregnation step has less than 2 wt % water. In some embodiments, the treatment solution used in the pressure impregnation step has less than 1 wt % water.

The Borate Ester solution (i.e., the reaction product of boric acid and the $C_2$-$C_6$ alkanolamine, such as MBE prepared from boric acid and ethanolamine) is then blended with a creosote/unsaturated fatty ester to form the treatment solution for the pressure impregnation. In some embodiments the Borate Ester solution has greater than or equal to 5 wt % water. In certain embodiments, the Borate Ester solution is substantially water free. In some embodiments the Borate Ester solution has less than 5 wt % water. In some embodiments the Borate Ester solution has less than 4 wt % water. In some embodiments the Borate Ester solution has less than 3 wt % water. In some embodiments the Borate Ester solution has less than 2 wt % water. In some embodiments the Borate Ester solution has less than 1 wt % water. In some embodiments the Borate Ester solution has less than 0.5 wt % water. In some embodiments the Borate Ester solution has less than 0.1 wt % water. In some embodiments the Borate Ester solution is a MBE solution prepared from boric acid and ethanolamine. The temperature of this blending step is not critical, however, the temperature is typically elevated in order to decrease the viscosity of the treatment solution and thereby facilitate the blending and to remove any remaining water present in the Borate Ester solution. As such, the temperature and period of time during which the elevated temperature is maintained is adjusted so that the blend is homogeneously mixed and substantially all water has been removed through evaporation (e.g., greater 95%, greater than 98%, or greater than 99% w/w free of water). Temperatures of about 120 to about 200° F. are commonly used.

In other embodiments, the ester of boric acid is prepared from a reaction mixture of about 50 wt % to about 70 wt %; boric acid, $C_1$-$C_6$ monoalkanolamine, and water. In certain embodiments, substantially all of the water is removed from the ester of boric acid before being added to the composition.

In other embodiments, the ester of boric acid is a $C_1$-$C_6$ monoalkanolamine ester of boric acid. In certain embodiments, the $C_1$-$C_6$ monoalkanolamine ester of boric acid is a monoethanolamine ester of boric acid. In other embodiments, the monoethanolamine ester of boric acid is a mixture of the mono, di, and triester of boric acid.

The composition may include one or more auxiliary solvents and/or co-solvents. For example, the composition may include up to 5, 10, 15 or 20 wt % of one or more auxiliary solvents and/or co-solvents. As used herein, the term "auxiliary solvents" or "co-solvents" include hydrocarbon moieties derived from petroleum products or agricultural sources, with the provision that the auxiliary solvent is not biodiesel. The auxiliary solvent may be blended with the hydrocarbon solvent to improve its physical characteristics.

In further embodiments, a wood treatment composition is provided where the composition is formed by: blending components comprising creosote and a fatty ester component and a catalyst, e.g., by blending at least about 85 wt % creosote, at least about 1% wt % of one or more $C_8$-$C_{50}$ fatty esters, and a Lewis acid catalyst; subjecting the components to an increased pressure of greater than 15 pounds per square inch (psi) and/or subjecting the components to a reduced pressure of less than 15 psi, typically less than about 5 psi.

In still further embodiments, a wood treatment composition is provided where the composition is formed by: blending components comprising creosote and a fatty ester component and a catalyst, e.g., by blending at least about 85 wt % creosote, at least about 1% wt % of one or more $C_8$-$C_{50}$ fatty esters, and a Lewis acid catalyst; heating the components to a temperature of at least about and more commonly at least about, for a time sufficient to allow the components to react and substantially reduce the level of naphthalene and/or total VOC emitted by the composition. Typically, the components are reacted such that the reaction product has a headspace VOC concentration at 70° C. of no more than about 100 μg/m$^3$ and, commonly, no more than about 50 μg/m$^3$ and/or a headspace naphthalene concentration at 70° C. of no more than about 10 μg/m$^3$ and often no more than about 5 μg/m$^3$.

In some embodiments of the wood treatment composition, the creosote of the composition comprises an odor (e.g., of creosote and/or naphthalene) before blending that is substantially reduced after the reaction composition is formed. In some embodiments, the odor of creosote comprises an odor of naphthalene.

In another embodiment, the creosote emits a first quantity of VOCs (as measured in μg VOC/m$^3$ atmosphere) before blending; the composition emits a second quantity of VOCs after blending; and the second quantity of VOCs is less than the first quantity of VOCs. For example, in some embodiments, the second quantity of VOCs is less than 10% of the first quantity of VOCs. It should be noted that the components may be subjected to an increased pressure of greater than 100 psi and a reduced pressure of less than −5 psi.

In other embodiments, the composition has a flashpoint that is suitable for industrial applications. In other embodiments, the composition has an open-cup flashpoint of at least 60° C. In certain embodiments, the composition has an open-cup flashpoint of at least 66° C. Further, the composition ay have an open-cup flashpoint of at least 70° C., 75° C., 80° C., 90° C., 100° C., or higher or an open-cup flashpoint between any two of these temperatures.

In open cup devices for the measurement of flash points, the sample is contained in an open cup which is heated, and at intervals a flame is brought over the surface. The measured flash point will actually vary with the height of the flame above the liquid surface. The best known example is the Cleveland open cup (COC, see ASTM Methods D92 and D-93). Unless stated otherwise, any references herein to values of open-cup flashpoint are as determined by the ASTM D-93 flashpoint determination procedure.

Alternatively, the flashpoint of the composition may be measured using closed-type testers. There are two types of closed cup testers: non-equilibrium, such as Pensky-Martens where the vapors above the liquid are not in temperature equilibrium with the liquid, and equilibrium, such as Small Scale (commonly known as Setaflash) where the vapors are deemed to be in temperature equilibrium with the liquid. Both of these types the cups are sealed with a lid through which the ignition source can be introduced. Closed cup testers normally give lower values for the flash point than open cup (typically about 5° C. to about 10° C. lower, or about 9° F. to about 18° F. lower) and are generally regarded as an approximation of the temperature at which the vapor pressure reaches the lower flammable limit.

The flash point is an empirical measurement rather than a fundamental physical parameter. The measured value will vary with equipment and test protocol variations, including temperature ramp rate (in automated testers), time allowed for the sample to equilibrate, sample volume, and whether the sample is stirred.

In other embodiments, the composition has an ignition temperature of at least about 500° C. In further embodiments, the composition has an octanol/water partition coefficient (log Kow) of about 1.0.

In other embodiments, the composition is a substantially homogenous solution. In most instances, the composition is a substantially homogenous solution at a temperature of about 15° C. to about 35° C. that generally remains homogenous for up to one, two, six or twelve months or longer. In certain embodiments, the composition is a substantially homogenous solution at a temperature of about 15° C. to about 35° C. for up to one month. In certain embodiments, the composition is a substantially homogenous solution at a temperature of about 15° C. to about 35° C. for up to one week. In certain embodiments, the composition is a substantially homogenous solution at a temperature of about 25° C. In certain embodiments, a solution is deemed a substantially homogenous solution when suspended solids within the solution are equal to or less than 5 wt %. In certain embodiments, suspended solids within the solution are equal to or less than 4 wt %. In certain embodiments, suspended solids within the solution are equal to or less than 3 wt %. In certain embodiments, suspended solids within the solution are equal to or less than 2 wt %. In certain embodiments, suspended solids within the solution are equal to or less than 1 wt %. In certain embodiments, suspended solids within the solution are equal to or less than 0.5 wt %. In certain embodiments, suspended solids within the solution are equal to or less than 0.25 wt %. In certain embodiments, suspended solids within the solution are equal to or less than 0.1 wt %.

Provided in another aspect is a wood treatment composition comprising a reaction product produced by reacting a mixture in the presence of a Lewis acid catalyst, wherein the mixture comprises: i) at least about 85 wt % creosote; and ii) at least about 1 wt % of an ester component containing one or more $C_8$-$C_{22}$ fatty acid alkyl esters; wherein the composition comprises at least about 90 wt % of the reaction product; the composition has an open-cup flashpoint of at least about 65° C.; the composition is a substantially homogenous solution at a temperature of about 15° C. to about 35° C. for up to one month; and the composition has a headspace naphthalene concentration at 70° C. of no more than about 5 ug/m$^3$.

In some embodiments, the mixture at least about 90 wt % creosote and at least about 3 wt % of the ester component; the ester component comprises at least about 80 wt % methyl and/or ethyl esters of $C_{12}$-$C_{18}$ fatty acids; and the mixture is reacted in the presence of the Lewis acid catalyst at a temperature of at least about 120° F. (~50° C.). In some embodiments, the composition has a headspace volatile organic compounds (VOC) concentration at 70° C. of no more than about 50 ug/m$^3$.

In some embodiments, the treatment solution comprises at least about 3 wt % of the ester component; and the ester component comprises at least about 80 wt % methyl and/or ethyl esters of lauric acid, myristic acid, palmitic acid, stearic acid and/or oleic acid. In some embodiments, the ester component comprises palm kernel oil FAME, coconut oil FAME and/or palm oil FAME.

In some embodiments, the composition has a specific gravity at 38° C. of at least 1.08 g/cc (in comparison to water at 15.5° C.). In some embodiments, the composition has a viscosity at 40° C. of at least about 4 mm$^2$/s. In some embodiments, the ester component comprises at least about 80 wt % methyl and/or ethyl esters of lauric acid, myristic acid, palmitic acid and/or stearic acid. In some embodiments, the ester component comprises at least about 80 wt % $C_1$-$C_6$ alkyl esters of capric acid, lauric acid, myristic acid, palmitic acid, stearic acid, oleic acid, linoleic acid and/or linolenic acid. In some embodiments, the ester component comprises at least about 90 wt % palm kernel oil FAME, coconut oil FAME and/or palm oil FAME.

In some embodiments, the mixture further comprises bunker oil. Provided in some embodiments is a wood treatment composition comprising a reaction product produced by reacting a mixture including creosote, bunker oil and a fatty ester component in the presence of a Lewis acid catalyst. The mixture may comprise: i) at least about 85 wt % creosote and bunker oil; and ii) at least about 1 wt % of an ester component containing one or more $C_8$-$C_{22}$ fatty acid alkyl esters. The composition typically includes at least about 90 wt % of the reaction product and has an open-cup flashpoint of at least about 65° C. Such compositions are desirably a substantially homogenous solution at a temperature of 15° C. to 35° C. for up to one month. The compositions may have a headspace naphthalene concentration at 70° C. of no more than about 5 ug/m$^3$. In some embodiments, the mixture comprises at least about 40 wt % of the creosote, at least about 40 wt % of the bunker oil and at least about 3 wt % of the ester component. In some embodiments, the mixture further comprises at least about 1 wt % of a borate ester. In some embodiments, the composition further comprises (1) a borate ester and (2) boric acid and/or sodium octaborate.

Provided in yet another aspect is a method of treating wood, comprising the steps of: a) immersing the wood in the treatment solution comprising any of the compositions described herein; and b) pressure impregnating the immersed wood under a pressure of at least about 15 psig (100 kPa-g).

Wood

Also provided herein is wood coated with or immersed in any of the wood treatment compositions disclosed herein. Further provided is wood treated according to any one of the methods disclosed herein.

In some embodiments, the wood does not emit a substantial odor of creosote. In other embodiments, the wood does not substantially emit volatile organic compounds (VOCs). For example, the wood may emit VOCs in the air immediately above the wood such that the wood is characterized by an emission VOC concentration at 70° C. of no more than of about 200 μg/m$^3$, 150 μg/m$^3$, 100 μg/m$^3$, 50 μg/m$^3$, 10 μg/m$^3$, 10 μg/m$^3$ or 5 μg/m$^3$, or an between any two of these values, where μg/m$^3$ refers to μg VOCs/m$^3$ atmosphere, which may be determined within one day, two days or five days of the wood being coated. In some embodiments, the wood treated by the present methods does not substantially emit VOCs at 70° C. In one embodiment, the wood may be characterized by an emission VOC concentration at 70° C. of no more than about 10 μg/m$^3$.

In other embodiments, the wood does not substantially emit naphthalene. For example, the wood treated with the preservative products described herein may emit substantially reduced amounts of naphthalene in the air immediately above the wood such that the wood is characterized by an emission naphthalene concentration at 70° C. of no more than about 200 μg/m$^3$, 150 μg/m$^3$, 100 μg/m$^3$, 50 μg/m$^3$, 10 μg/m$^3$, 10 μg/m$^3$ or 5 μg/m$^3$, or an between any two of these values, where μg/m$^3$ refers to μg naphthalene/m$^3$ atmosphere, within one day, two days or five days of the wood being coated. In some embodiments, wood treated by the present methods does not substantially emit naphthalene at 70° C., 100° C., 120° C., 150° C., or a temperature between any two of these values. In one embodiment, the wood may be characterized by an emission naphthalene concentration at 70° C. of no more than about 3 μg/m$^3$.

The values disclosed above with respect to emissions by wood that has been treated with the present creosote-based compositions refer emission levels as determined by the following procedure. As used herein, the term "emission VOC concentration" refers to the level of emitted volatile organic compounds at the indicated temperature as determined by this procedure. As used herein, the term "emission naphthalene concentration" refers to the level of emitted naphthalene as determined by this procedure. Wood piece(s) which have been treated with a creosote-based composition are placed in a closed container such that the wood takes up about 10 to 95 vol % of the capacity of the container. The system is allowed to equilibrate at 70° C. (or other indicated temperature) for at least 1-24 hours and a 10 cc gas sample is then removed from the headspace in the closed container. The concentration of volatile organic compounds and/or naphthalene in the 10 cc gas sample is determined by standard analytical methodology.

In some embodiments, the wood is a utility pole. In other embodiments, the wood is a railroad tie. In certain embodiments, the wood is a dimensional timber. In some embodiments, the wood is a mixed softwood cant. In other embodiments, the wood is a mixed hardwood cant. In other embodiments, the wood is a round utility pole with the outer bark removed. In other embodiments, the wood is a vascular cambium. In certain embodiments, the moisture content of the wood is greater than 40 wt %, although wood pieces with lower moisture contents may also be effectively treated using the present methods.

Methods of Use

In another aspect, a method is provided of minimizing odor in treated wood, comprising the steps of: a) immersing the wood in the treatment solution comprising any of the compositions described herein; and b) pressure impregnating the immersed wood above 1 atm-absolute (101 kPa). In some embodiments of the method, the treatment solution comprises any one of the creosote-based compositions described herein.

In another embodiment, a method for treating wood is provided, the method comprising the steps of: a) immersing the wood in a wood treatment solution comprising any of the compositions disclosed herein; and b) pressure impregnating the immersed wood above 1 atm-absolute (101 kPa). In some embodiments of the method, the treatment solution comprises any one of the creosote-based compositions described herein.

In some embodiments the method further comprises c) separating the wood from the treatment solution after the pressure impregnation; d) exposing the wood to an expansion bath; and e) exposing the wood to a vacuum below 1 atm-absolute after completion of the expansion bath.

In another embodiment, a method for treating wood is provided, the method comprising the steps of: a) immersing wood in a wood treatment solution; and b) pressure impregnating the immersed wood under a pressure of at least about 2 atm-gauge (203 kPa) and a temperature of at least about 120° F. (~50° C.); wherein the wood treatment solution comprises: 1) at least about 85 wt % creosote; 2) at least about 1 wt % of an ester component containing one or more $C_8$-$C_{50}$ fatty esters; and 3) a Lewis acid catalyst. In some embodiments of the method, the treatment solution comprises any one of the creosote-based compositions described herein.

In some embodiments of any of the methods, the treatment solution comprises any one of the creosote-based compositions described herein one or more $C_{10}$-$C_{50}$ unsaturated fatty esters. In some embodiments of any of the methods, the composition comprises 1-30 wt %, 1-20 wt %, 1-10 wt %, 1-8 wt %, 1-5 wt % of the one or more $C_{10}$-$C_{50}$ fatty esters. In some embodiments of any of the methods, the composition comprises 1, 2, 3, 4, 5, 6, 7, 8, 9, 10, 11, 12, 13, 14, 15, 16, 17, 18, 19 or 20 wt % of the one or more $C_{10}$-$C_{50}$ fatty esters specified herein.

In some embodiments of any of the methods, the fatty ester is an ester of a fatty acid that is selected from the group consisting of oleic acid, linoleic acid, linolenic acid, arachidonic acid and combinations thereof. In some embodiments of any of the methods, the unsaturated fatty ester is an ester of linoleic acid.

In some embodiments of any of the methods, the amount of volatile organic compounds (VOCs) and/or naphthalene emitted into the atmosphere at 70° C. by the composition is less than about 100 ug/m$^3$. In some embodiments of the method, the amount of VOCs and/or naphthalene emitted into the atmosphere at 70° C. by the composition is less than about 20 ug/m$^3$.

In certain embodiments, any of the disclosed methods is a "one-step process" for treating wood to prevent or reduce insect or microbial decay, such as any of the one-step processes described in the published U.S. patent application 2012/0171504, the entire contents of which are incorporated herein by reference.

To carry out the one-step processes, the wood being treated to reduce insect and/or microbial decay is immersed in the treatment solution and subjected to conditions that cause solution to migrate into the interior of the wood. The disclosed one-step process is more convenient and economical than the conventional two-step "envelope" treatment process that is common in the industry for treating wood. In the two step treatment process, the wood is first immersed in a solution and set aside for about six weeks under cover, thereby allowing the solution to diffuse throughout the wood. This first step is followed by a second step, treatment of the solution-infused wood with, for example, creosote, to form a hydrophobic envelope around the infused wood. This second step, the creosote envelope, prevents leaching of the solution from the wood.

In other embodiments of the method, the pressure impregnation is carried out at a pressure of about 100 psi to about 160 psi (689 kPa to about 1,103 kPa) and a temperature of about 120° F. to about 170° F. (about 49° C. to about 77° C.). In certain embodiments of the method, the pressure is applied gradually at a rate of about 1 psi/min to about 20 psi/min (about 7 kPa/min to about 138 kPa/min). In certain embodiments of the method, the pressure is applied gradually at a rate of about 1 psi/min to about 5 psi/min (about 7 kPa/min to about 34 kPa/min). In other embodiments, the pressure impregnation is carried out according to the Lowry or Rueping process.

In other embodiments, the method further comprises separating the wood from the treatment solution after the pressure impregnation. In certain embodiments, the method further comprises separating the wood from the treatment solution after the pressure impregnation; and exposing the wood to an expansion bath. In other embodiments, the method further comprises exposing the wood to a vacuum below 1 atm-absolute (101.325 kPa) after completion of the expansion bath. In certain embodiments of the method, the vacuum is applied gradually at a rate of about 1 psi/min to about 5 psi/min (about 7 kPa/min to about 34 kPa/min).

Definitions

As used in the specification and claims, the singular form "a", "an" and "the" include plural references unless the context clearly dictates otherwise.

As used herein, the term "comprising" is intended to mean that the compositions and methods include the recited elements, but not excluding others. As used herein, the term "consists essentially of" when described the constituents of a group, means that the group is made up primarily of those constituents and does not include other constituents in an amount that would substantially alter the functional properties of the composition, typically no more than about 5 wt %, 4 wt %, 3 wt %, 2 wt %, 1 wt % or 0.1 wt % of such other constituents. For example, a unsaturated fatty ester "group" that consisted essentially of a linoleic acid ester "constituent," would commonly contain no more than about 5 wt %, 4 wt %, 3 wt %, 2 wt %, 1 wt % or 0.1 wt % of constituents other than linoleic acid ester. "Consisting of" shall mean excluding more than trace amount of other ingredients and substantial method steps recited. Embodiments defined by each of these transition terms are within the scope of this invention.

As used herein, the term "substantially free," means, in certain embodiments, no more than about 5 wt %, 4 wt %, 3 wt %, 2 wt %, 1 wt %, or 0.1 wt % of the designated component. For example, a composition that is substantially free of a specified material, includes no more than about 5 wt %, 4 wt %, 3 wt %, 2 wt %, 1 wt % or 0.1 wt % of the specified material.

The compositions and methods described herein are illustrated by the following examples which are not intended to limit the scope of the present invention in any way.

EXAMPLES

Example 1. Odor Suppression

Head space analysis testing was used to measure the quantity of VOCs emitted by the compositions described herein. Head space analysis is a technique for using gas chromatography for quantifying the vapors in the gas above the compositions described herein. The procedure involves the extraction of a volume of the equilibrium gas over the sample (usually about 10 ml) by a syringe through a vial containing a bed of an appropriate absorbent. The vial is the placed in line with a gas chromatography column, the vial heated and the vaporized sample swept on the column and the components of the gas are separated. This technique includes the use of a GC-MS to analyze the components present in the vapor sample. 100 ml samples of each of preservative solutions are brought, e.g., to 180° F. (~82° C.) to determine what gases are present in the atmosphere above the preservative solutions.

In this testing for the efficacy of the odor suppression, naphthalene is used as an indicator for odor. A wood preserving operation emission criteria of 3 µg/m$^3$ naphthalene in the air (as sampled at 180° F. (~82° C.) is established. The levels shown below that are at or below 3 µg/m$^3$ of naphthalene are considered passing. This is determined to be the level at which 3 out of 5 residents in the vicinity of the wood treating plant would not be able to detect the odor of naphthalene emissions from a wood treatment operation.

Creosote-containing Formulations 1-6, in the table below, were prepared and measured for the percentage reduction of naphthalene emission (as sampled at 180° F. (~82° C.) in each formulation relative to naphthalene emission in the starting creosote. Formulations 1-5 were prepared by blending 2 liters creosote with the chosen ratio of additive A and catalyst B in a closed reaction vessel (Formulation 6 is a sample of the untreated creosote). A first sample of the headspace from the reaction vessel was tested for naphthalene before each Formulation was subjected to increased pressure and vacuum. The reaction was heated to 180° F. and a pressure cycle was applied at 150 psig for 2 hours followed by a negative pressure of −14 psig for thirty minutes. The reaction mixture was then allowed to equilibrate at 180° F. under ambient conditions and a second sample was taken from the headspace from the reaction vessel and tested for naphthalene. The target value for the second sample of the headspace naphthalene concentration at temperature between 120-220° F., such as 180° F. was 0.3 ug naphthalene/m$^3$ of air.

Example 2. Stability of Creosote-Based Preservative Solutions Containing Fatty Ester Reaction Products The stability of Formulations 1-5 can be measured. Formulations 1-5 are prepared using a standard magnetic stirring system. The resulting creosote-based formulations are heated to operating temperatures of about 100° C. and then cooled back to storage of about 70° C. The resulting creosote-based formulations are heated to operating temperatures of about 70° C. and then cooled back to storage of about 50° C. The formulations are checked for stratification and/or the formation of sludge at both temperatures. All mixing is done in a standard 2 liter beaker with the volume adjusted to 1.5 liters.

Additional stability tests are conducted with treated wood samples over varying moisture contents and species to determine if the application of pressure, temperature, wood extractives and sudden vacuum causes the solution to have phase changes from liquid to solid. This is referred to as stressing the solution.

Example 3. Properties of the Creosote/Fatty Ester Formulations

Experiments may be undertaken to confirm that the disclosed compositions do not materially affect the properties of the creosote as per the AWPA 2012 specification P1/P13-09 and P2-09. The Table below lists the physical properties of a creosote formulation required to meet the standards of AWPA specification P2-09.

TABLE 1

Reduction of Naphthalene Emission from Creosote

| Formulation | Additive A | Catalyst B | Naphthalene concentration in initial creosote | Naphthalene concentration in treated sample | Pass/Fail Comments |
|---|---|---|---|---|---|
| 1 | Arachidonic methyl ester (5 wt %) | Zinc (1 gram) | 511 µg/m$^3$ | 0.2 µg/m$^3$ | Pass- No diff noted in solution or product |
| 2 | Carboxylic acid methyl ester blend (5 wt %) | Zinc (1 gram) | 566 µg/m$^3$ | 0.3 µg/m$^3$ | Pass - No diff noted in solution or product |
| 3 | Soya based biodiesel (25 wt %) | Zinc (1 gram) | 566 µg/m$^3$ | 40 µg/m$^3$ | Fail- Reduction in viscosity |
| 4 | Soya-based biodiesel (35 wt %) | NA | 621 µg/m$^3$ | 36 µg/m$^3$ | Fail- Emulsion/ sludge present; Reduced viscosity |
| 5 | 1:1:1:1 ratio linoleic, oleic, linolenic and arachidonic Me esters (5 wt %) | Zinc (1 gram) | 720 µg/m$^3$ | 0.2 µg/m$^3$ | Pass- No diff. noted in solution or product |
| 6 | None (creosote alone) | NA | 621 µg/m$^3$ | 621 µg/m$^3$ | Fail |

* The "Carboxylic acid methyl ester blend" in the above table is a blend with methyl laurate (about 54 wt %), and the methyl esters of myristic acid (22%), palmitic acid (11 wt %), oleic acid (8 wt %), stearic acid (3 wt %), linoleic acid (1 wt %) and capric acid (0.5 wt %).

TABLE 2

P2-09 Standard for Creosote Solution

|  | Creosote * | Creosote ** |
|---|---|---|
| Water Content (% by volume) | <1.5 | <3.0 |
| Material insoluble in Xylene | 3.5 | <4 |
| Specific Gravity @ 38° C. (compared to Water @15.5° C.) | | |
| Whole Creosote | >1.080 <1.130 | >1.080 <1.130 |
| Fraction 235-315° C. | >1.025 | >1.025 |
| Fraction 315-355° C. | >1.085 | >1.085 |
| Distillation | | |
| Up to 210° C. | <5.0 | <5.0 |
| Up to 235° C. | <25.0 | <25.0 |
| Up to 315° C. | >32.0 | >32.0 |
| Up to 355° C. | >52.0 | >52.0 |

Creosote * is new creosote that has not yet been in contact with wood.
Creosote ** is creosote that has been in contact with wood and the chemicals in wood and has been "stressed"

Example 4. Efficacy Testing of Wood Treated With the Disclosed Compositions

ASTM test fungi in Petri dishes may be subjected to treatment with solutions of untreated cresosote and the present low odor creosote formulations to determine their efficacy in preventing the growth wood-degrading fungal strains. The agar plate test method allowed for rapid determinations of antifungal efficacy against wood-degrading strains of concern. The certified cultures were obtained from the American Type Culture Collection (ATCC) and propagated as per the product information sheets:

*Irpex lacteus*: ATCC number 11245, yeast medium Difco 0712 (ATCC medium no. 200)
*Neolentius lepideus*: ATCC number 12653, YM agar Difco 0712 (ATCC medium no. 200)
*Postia poria*: ATCC number 11538, YM agar Difco 0712 (ATCC medium no. 200)
*Pleurotus ostreatus*: ATCC number 32237, YM agar Difco 0712 (ATCC medium no. 200)
*Trametes versicolor*: ATCC number 42462, Hagem's-Modess medium (ATCC medium no. 479)
*Gleoephyllum trabeum*: ATCC number 11539, Potato Dextrose Agar with 0.5% yeast extract (ATCC medium no. 337)

Each plate is then inoculated in a flame induced sterile environment with a 5 mm diameter agar plug fungal colony of those fungi listed. Plates subsequently receive surface application of 0.5 ml and 1 ml of creosote and creosote/fatty ester blends; and controls having only the fungal colony. The plates are incubated for 14 days at 30° C. and the presence or absence of fungal growth is noted and measured.

The results of agar plate testing show whether or not the tested products exhibit antimicrobial activity. The growth of fungi is completely inhibited by the creosote. Controls showed complete coverage of the plate.

TABLE 3

Agar Plate Testing

| Fungi | Replications | Control | Creosote |
|---|---|---|---|
| 11245 | 7 | FPG | NG |
| 12653 | 7 | FPG | NG |
| 11538 | 7 | FPG | NG |
| 32237 | 7 | FPG | NG |
| 42462 | 7 | FPG | NG |
| 11539 | 7 | FPG | NG |

*FPG—Full growth of Fungi on Plate Agar
**NG—No Growth of Fungi on Plate Agar

Example 5. Soil Block Efficacy Testing

Testing With Soil-Block Cultures: Standard soil block efficacy testing experiments and soil bed testing experiments can be conducted according to the AWPA guidelines.

For example, mixed hardwood blocks (from about 14 mm to about 19 mm) are tested at various weight percentages of creosote; and the disclosed creosote-based compositions are tested in a five step retention series. Treated blocks are exposed to the destructive species of fungi outlined above for periods of up to 16 weeks at about 25° C. to about 27° C. and about 65% to about 75% relative humidity. Efficacy is evaluated as mass loss on each block, according to method E10-09 in the AWPA 2011 standards.

Example 6. Treating Cycles for Infusing the Creosote-based Compositions Into Softwood Utility Poles Red Pine
Dry: Relatively dry Red Pine utility poles are loaded onto trams and placed into a treatment cylinder. The air pressure is kept at atmospheric pressure or increased to approximately 40 psi (276 kPa), with controlled venting, while filling the cylinder with preservative solution of creosote; creosote/unsaturated fatty ester blends. The temperature is increased to 150° F. (66° C.). The pressure is then gradually increased to approximately 150 psi (1,034 kPa) over 30 min. The pressure was then gradually released over the next 30 minutes and the preservative (e.g., creosote/unsaturated fatty ester formulations) is pumped from the treatment cylinder. After the preservative is pumped from the treatment cylinder, a vacuum is gradually applied over 20 minutes, reaching the 27 inches of Hg level at the end of the 20 minute period. The vacuum is then released and live steam is injected, to reduce the oil viscosity, for 1 hour at 160° F. (71° C.), followed by a final vacuum for over 30 minutes.

Wet: Moist or wet Red Pine utility poles are placed into the treatment cylinder and only ¾ of the preservative solution was used during the filling step to create an air space. As the oil was heated and a vacuum was applied, moisture from the wet pole is drawn off the top of the cylinder. Heat and vacuum are maintained until the rate of accumulation of water in the steam capture tank is less than 50 gallons per hour. Otherwise, the remaining treatment steps are the same as for dry poles.

Douglas Fir
Dry: Relatively dry Douglas Fir utility poles are loaded onto trams and placed into the treatment cylinder. The air pressure is kept at atmospheric pressure or increased to approximately 60 psi (414 kPa), with controlled venting, while filling the cylinder with preservative solution of creosote or creosote/unsaturated fatty ester blends. The temperature is increased to 160° F. (71° C.). The pressure is then gradually increased to approximately 160 psi (1,103 kPa) over 30 min. Pressure is maintained several hours until gross retention of the preservative solution is achieved. The pressure is then gradually released over the next 30 minutes and the preservative is pumped from the treatment cylinder. After the preservative is pumped from the treatment cylinder, a vacuum is gradually applied over 60 minutes, reaching 27 inches of Hg at the end of the 60 minute period. The vacuum is then released and live steam is injected, to reduce the oil viscosity, for 1 hour at 160° F. (71° C.), followed by a final vacuum for over 60 minutes.

Wet: Moist or wet Douglas Fir utility poles are placed into the treatment cylinder and only ¾ of the preservative solution is used during the filling step to create an air space. As the oil is heated and a vacuum was applied, moisture from the wet pole is drawn off the top of the cylinder. Heat and vacuum are maintained until the rate of accumulation of water in the steam capture tank is less than 50 gallons per hour. Otherwise, the remaining treatment steps are the same as for dry poles.

Southern Yellow Pine

Dry: Relatively dry Southern Yellow Pine utility poles are loaded onto trams and placed into the treatment cylinder. The air pressure is kept at atmospheric pressure or increased to approximately 30 psi (207 kPa), with controlled venting, while filling the cylinder with preservative solution of creosote; creosote/unsaturated fatty ester blends. The temperature is increased to 150° F. (66° C.). The pressure is then gradually increased to approximately 150 psi (1,034 kPa), over 20 min. The pressure is then gradually released over the next 20 minutes and the preservative is pumped from the treatment cylinder. After the preservative is pumped from the treatment cylinder, a vacuum is gradually applied over 20 minutes, reaching 27 inches of Hg at the end of the 20 minute period. The vacuum is then released and live steam is injected, to reduce the oil viscosity, for 1 hour at 160° F. (71° C.), followed by a final vacuum for over 30 minutes.

Wet: Moist or wet Southern Yellow Pine utility poles are placed into the treatment cylinder and steamed while pulling a vacuum to remove moisture. Otherwise, the remaining treatment steps were the same as for dry poles.

Example 7. Treating Cycles for Infusing Creosote/Fatty Ester Formulations Into Hardwood Utility Poles Hardwood utility poles are subjected to similar Treatment Cycles with creosote; creosote/fatty ester blends; as those used for Red Pine utility poles. However, an expansion bath is used for one hour at a 10° F. higher temperature, followed by live steaming.

Example 8. Burn Testing

Burn testing is conducted, for example, at the Institute for Combustion Science and Environmental Technology's (IC-SET) gas emissions laboratory in Bowling Green Ky., to confirm that the dioxin and furan levels do not increase upon combustion. Fire retardant properties, which are generally proportional to concentration of boron in the formulation, are also evaluated according to the AWPA specifications.

Example 9. Leaching

The leaching of the poles is tested according to a modified E11-06 AWPA method. Replicates of 8 foot pole sections are leached for a two week periods. Poles treated with creosote; creosote/fatty ester blends; are evaluated to confirm that there is no significance difference between the leaching characteristics of these poles.

Example 10. Mechanical Properties

Mechanical properties of the wood are tested in conjunction with Nova Scotia Power's (NSP) Engineering and Operational Groups. Surface hardness, ease of drilling, gaff penetration for climbing the poles, strength, modulus of elasticity (MOE), and modulus of rupture (MOR) are tested as per the ASTM D1036 standard. The gaff penetration and drilling tests are performed by actual linemen, on installed poles treated with creosote; or creosote/fatty ester blends; Static bending according the ASTM D1036 testing method is performed in the presence of three Engineers from NSP, and all poles are observed for their deflection upon load indicating higher than acceptable modulus of elasticity and modulus of rupture. For example, a Douglas Fir pole is generally required to take 3700 pounds of force. Poles treated with creosote; creosote/fatty ester blends; or are contemplated to withstand an extreme ultimate horizontal breaking force, for example, in the event that an electric line is knocked over.

Example 11. Corrosion Testing

Poles treated with creosote; creosote/unsaturated fatty ester blends; are contemplated to undergo minimal corrosion, according to results obtained from ASTM designated tests. Immersion corrosion testing (AWPA standard E-12-94) is conducted to determine the susceptibility of galvanized metal hardware in contact with treated wood to corrosion once installed into utility poles that were treated with creosote; creosote/unsaturated fatty ester blends.

This method compares the initial mass of the hardware to that obtained after environmentally accelerated contact with the treated material for a specified period of time. The mass loss is then translated into a projected/anticipated rate of corrosion for that particular metal while in contact with that particular treated product. These tests, using creosote; creosote/unsaturated fatty ester blends; are contemplated to show no significant corrosion on galvanized hardware.

Each corrosion simulation is replicated 4 times with 4 bolt clusters for each treatment. Specified AWPA environmental parameters (49±1° C. and 90±1% relative humidity) are applied in accelerated growth chambers for a periods of 240 hours and 480 hours, during which no significant corrosion is contemplated to occur for the above-described treatments.

Illustrative Embodiments

The following exemplary embodiments are presented to illustrate the present polymer-based composite materials, coatings and methods to assist one of ordinary skill in making and using the same. These illustrative embodiments are not intended in any way to otherwise limit the scope of the invention described herein.

One embodiment provides a wood treatment composition comprising a reaction product produced by reacting a mixture in the presence of a Lewis acid catalyst, wherein the mixture typically includes (i) at least about 85 wt % creosote; and (ii) at least about 1 wt % of an ester component containing one or more $C_8$-$C_{50}$ fatty esters. The composition commonly comprises at least about 90 wt % of the reaction product. The mixture may be reacted in the presence of the Lewis acid catalyst at a temperature of at least about 120° F.

(~50° C.)/150° F. (~65° C.). The Lewis acid catalyst my include one or more of an acidic clay, zeolite, aromatic sulfonic acid, polyphosphoric acid, zinc, zinc salt, iron, iron salt, aluminum trihalide, boron trihalide or iodine. In some instances, the reaction mixture may also include bunker oil. The composition desirably has a headspace volatile organic compounds (VOC) concentration at 70° C. of no more than about 100 µg/m$^3$ within one day of the reaction product being produced. In many instances, the composition may have a headspace naphthalene concentration at 70° C. of no more than about 10 µg/m$^3$ within one day of the reaction product being produced. The present wood treatment composition desirably has an open-cup flashpoint of at least about 65° C. The creosote typically has an odor that is substantially reduced after reaction of the creosote in presence of the Lewis acid catalyst and the ester composition. In many instances, the creosote has an odor of naphthalene that is substantially reduced after reaction of the creosote in presence of the Lewis acid catalyst and the ester composition. The composition wood treatment desirably remains as a substantially homogenous solution at a temperature of 15° C. to 35° C. for up to one month. The wood treatment compositions of this embodiment commonly have a specific gravity at 38° C. of at least 1.08 g/cc (in comparison to water at 15.5° C.) and a viscosity at 40° C. of at least about 4 mm$^2$/s.

In some embodiments of the wood treatment composition described in the paragraph above, the ester component includes at least about 90 wt % methyl esters of capric acid, lauric acid, myristic acid, palmitic acid, stearic acid and/or oleic acid. In other embodiments of the wood treatment composition includes at least about 70 wt % $C_{10}$-$C_{16}$ saturated fatty acid $C_1$-$C_6$ alkyl esters (e.g., methyl and/or ethyl esters). The wood treatment compositions of this embodiment may also include a borate ester, such as a monoalkanolamine ester of boric acid. For example, the wood treatment composition may include at least about 1 wt % and, commonly, at least about 3 wt % of the borate ester. The monoalkanolamine ester of boric acid may be a monoethanolamine ester of boric acid. The wood treatment compositions of this embodiment may also boric acid and/or sodium octaborate in addition to the borate ester.

Certain embodiments are directed to a wood treatment composition comprising a reaction product produced by reacting a mixture in the presence of a Lewis acid catalyst, wherein the mixture typically includes (i) at least about 85 wt % creosote; and (ii) at least about 1 wt % of an ester component which comprises at least about 50 wt % $C_{10}$-$C_{22}$ saturated fatty acid alkyl esters. In some instances, ester component consists essentially of $C_{10}$-$C_{22}$ saturated fatty acid alkyl esters. The Lewis acid catalyst my include one or more of an acidic clay, zeolite, aromatic sulfonic acid, polyphosphoric acid, zinc, zinc salt, iron, iron salt, aluminum trihalide, boron trihalide or iodine. The composition wood treatment desirably remains as a substantially homogenous solution at a temperature of 15° C. to 35° C. for up to one month.

Another embodiment provides a wood treatment composition comprising a reaction product produced by reacting a mixture, which includes (i) at least about 85 wt % creosote; and (ii) at least about 1 wt % of one or more $C_8$-$C_{50}$ fatty esters, in the presence of a Lewis acid catalyst. The mixture may be reacted in the presence of the Lewis acid catalyst at an increased pressure of greater than 1 atm-absolute (101.325 kPa) and/or a reduced pressure of less than 1 atm. In some instances mixture may be reacted in the presence of the Lewis acid catalyst to an increased pressure of at least about 7 atm-absolute and a reduced pressure of no more than about 0.7 atm-absolute. The mixture may be reacted in the presence of the Lewis acid catalyst at a temperature of at least about 120° F. (~50° C.)/150° F. (~65° C.). The composition wood treatment desirably remains as a substantially homogenous solution at a temperature of 15° C. to 35° C. for up to one month.

Another embodiment provides a wood treatment composition comprising a reaction product produced by reacting a mixture, which includes (i) at least about 85 wt % creosote; and (ii) at least about 1 wt % of one or more $C_8$-$C_{50}$ fatty esters, in the presence of a Lewis acid catalyst. The Lewis acid catalyst my include one or more of an acidic clay, zeolite, aromatic sulfonic acid, polyphosphoric acid, zinc, zinc salt, iron, iron salt, aluminum trihalide, boron trihalide or iodine. Quite commonly, the Lewis acid catalyst comprises zinc chloride, ferric chloride or a mixture thereof. In other cases, the Lewis acid catalyst comprises a porous crystalline zeolite containing hydrated cations. The composition wood treatment desirably remains as a substantially homogenous solution at a temperature of 15° C. to 35° C. for up to one month.

Yet another embodiment provides a wood treatment composition, which includes the reaction product produced by reacting a mixture including creosote and fatty acid alkyl ester(s) in the presence of a Lewis acid catalyst. The reaction mixture typically includes (a) at least about 85 wt % creosote; and (b) at least about 1 wt % of an ester component containing one or more $C_8$-$C_{22}$ fatty acid alkyl esters. The wood treatment composition commonly contains about 90 wt % or more of the reaction product. The wood treatment composition generally has an open-cup flashpoint of at least about 65° C. and remains a substantially homogenous solution at a temperature of about 15° C. to about 35° C. for up to one month. The wood treatment composition desirably has a headspace naphthalene concentration at 70° C. of no more than about 5 µg/m$^3$. The wood treatment compositions of this embodiment may also include a borate ester, such as a monoalkanolamine ester of boric acid. For example, the wood treatment composition may include at least about 1 wt % and, commonly, at least about 3 wt % of the borate ester. The monoalkanolamine ester of boric acid may be a monoethanolamine ester of boric acid. The wood treatment compositions of this embodiment may also boric acid and/or sodium octaborate in addition to the borate ester. The wood treatment compositions of this embodiment typically have a headspace volatile organic compounds (VOC) concentration at 70° C. of no more than about 50 µg/m$^3$.

In some versions of the embodiments described in the paragraph above the reaction mixture includes at least about 90 wt % creosote and at least about 3 wt % of the ester component; where the ester component comprises at least about 80 wt % methyl and/or ethyl esters of $C_{12}$-$C_{18}$ fatty acids. The mixture may desirably be reacted in the presence of the Lewis acid catalyst at a temperature of at least about 120° F. (~50° C.). For example, the reaction mixture may include at least about 3 wt % of the ester component where the ester component includes at least about 80 wt % methyl and/or ethyl esters of lauric acid, myristic acid, palmitic acid, stearic acid and/or oleic acid. In other instances, the ester component may include palm kernel oil FAME, coconut oil FAME and/or palm oil FAME. The wood treatment compositions of this embodiment commonly have a specific gravity at 38° C. of at least 1.08 g/cc (in comparison to water at 15.5° C.) and a viscosity at 40° C. of at least about 4 mm$^2$/s.

In some embodiments, the wood treatment composition includes a reaction product produced by reacting a mixture including creosote and fatty acid alkyl ester(s) in the presence of a Lewis acid catalyst, where the ester component may include at least about 80 wt % methyl and/or ethyl esters of lauric acid, myristic acid, palmitic acid and/or stearic acid. In certain embodiments, the ester component may include at least about 80 wt % $C_1$-$C_6$ alkyl esters of capric acid, lauric acid, myristic acid, palmitic acid, stearic acid, oleic acid, linoleic acid and/or linolenic acid. In some embodiments, the ester component may include at least about 90 wt % palm kernel oil FAME, coconut oil FAME and/or palm oil FAME.

Other embodiment provide a wood treatment composition, which includes the reaction product produced by reacting a mixture including creosote and fatty acid alkyl ester(s) in the presence of a Lewis acid catalyst; where the reaction mixture comprises at least about 40 wt % of the creosote, at least about 40 wt % of bunker oil and at least about 3 wt % of the ester component. The ester component consists essentially of one or more $C_8$-$C_{50}$ fatty esters, and typically, $C_8$-$C_{22}$ fatty esters.

Other embodiments are directed to a method of treating wood using the wood treatment compositions described herein. The treatment method may include: (a) immersing the wood in the wood treatment solution; and (b) pressure impregnating the immersed wood above 1 atm-absolute (101 kPa). In some instances, the method may also include (c) separating the wood from the treatment solution after the pressure impregnation; (d) exposing the wood to an expansion bath; and (e) exposing the wood to a vacuum below 1 atm after completion of the expansion bath.

Other embodiments provide a method of treating wood using the wood treatment compositions described herein which include (a) immersing the wood in the wood treatment solution; and (b) pressure impregnating the immersed wood, e.g., under a pressure of at least about 15 psig (100 kPa-g). Often the pressure impregnation of the immersed wood is carried out under a pressure of at least about 30 psig (~200 kPa-g) and a temperature of at least about 120° F. (~50° C.). The wood treatment solution may include (1) at least about 85 wt % creosote; (2) at least about 1 wt % of an ester component comprising one or more $C_{10}$-$C_{22}$ fatty acid alkyl esters; and (3) a Lewis acid catalyst. In some examples, the treatment solution comprises at least about 3 wt % of the ester component; and the ester component comprises at least about 80 wt % methyl and/or ethyl esters of lauric acid, myristic acid, palmitic acid, stearic acid and/or oleic acid. In other examples, the ester component comprises palm kernel oil FAME, coconut oil FAME and/or palm oil FAME.

Other embodiments are directed to a method of treating wood using the wood treatment compositions described herein, where the method includes: (a) immersing wood in the wood treatment solution; and (b) pressure impregnating the immersed wood under a pressure of at least about 15 psig (103 kPa-g) and a temperature of at least about 120° F. (~50° C.); where the wood treatment solution comprises: (1) at least about 85 wt % creosote; (2) at least about 1 wt % of an ester component containing one or more C8-C50 fatty esters; and (3) a Lewis acid catalyst.

Certain embodiments provide a wood treatment composition formed by (1) blending components comprising at least about 85 wt % creosote, at least about 1% wt % of one or more $C_8$-$C_{50}$ fatty esters, and a catalyst; (2) subjecting the components to an increased pressure of greater than 15 pounds per square inch-absolute (psia) and/or subjecting the components to a reduced pressure of less than 15 psia. In the wood treatment composition produced by such a method, the creosote typically has an odor that is substantially reduced after reaction of the creosote in presence of the Lewis acid catalyst and the ester composition. The wood treatment composition typically has an odor of naphthalene that is substantially reduced after reaction of the creosote in presence of the Lewis acid catalyst and the ester composition. In certain embodiments, the creosote emits a first quantity of volatile organic compounds (VOCs) before blending and emits a second quantity of VOCs after blending; where the second quantity of VOCs is less than the first quantity of VOCs. For example, the second quantity of VOCs may be less than 10% of the first quantity of VOCs.

Other embodiments provide wood coated with or immersed in a wood treatment composition according to any of the descriptions set forth herein. Such treated wood may not substantially emit an odor of creosote and/or may not substantially emit volatile organic compounds (VOCs). For example, wood treated with the wood treatment compositions described herein may not substantially emit VOCs greater than about 10 µg VOCs/m$^3$ of air immediately above the wood within one day of the wood being coated.

Wood treated with the present compositions according to any of the methods set forth herein may not substantially emit naphthalene. For example, such treated wood may not substantially emit naphthalene greater than about 10 µg naphthalene/m$^3$ of air immediately above the wood within one day of the wood being coated. Such treated wood may have an emission VOC concentration at 70° C. of no more than about 50 µg/m$^3$. Typical examples of wood pieces that may be treated according to the methods described herein include utility poles and railroad ties.

It will be readily apparent to one skilled in the art that varying substitutions and modifications may be made to the invention disclosed herein without departing from the scope and spirit of the invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

What is claimed is:

1. A wood treatment composition comprising a reaction product produced by reacting a mixture in the presence of a Lewis acid catalyst, wherein the mixture comprises
   i) at least about 85 wt % creosote; and
   ii) at least about 1 wt % of an ester component containing one or more $C_8$-$C_{50}$ fatty esters.

2. The composition of claim 1, wherein the composition comprises at least about 90 wt % of the reaction product.

3. The composition of claim 1, wherein the mixture is reacted in the presence of the Lewis acid catalyst at a temperature of at least about 150° F. ~65° C.).

4. The composition of claim 1, wherein the composition has a headspace volatile organic compounds (VOC) concentration at 70° C. of no more than about 100 µg/m$^3$.

5. The composition of claim 1, wherein the composition has a headspace naphthalene concentration at 70° C. of no more than about 10 µg/m$^3$.

6. The composition of claim 1, having an open-cup flashpoint of at least 66° C.

7. The composition of claim 1, wherein the $C_8$-$C_{50}$ fatty esters are alkyl esters of $C_{10}$-$C_{22}$ fatty acids.

8. The composition of claim 1, wherein the ester component comprises at least about 50 wt % alkyl esters of $C_{10}$-$C_{22}$ fatty acids.

9. The composition of claim 1, wherein the ester component comprises at least about 90 wt % methyl esters of capric acid, lauric acid, myristic acid, palmitic acid, stearic acid and/or oleic acid.

10. The composition of claim 1, wherein the ester component comprises at least about 70 wt % methyl esters of $C_{10}$-$C_{16}$ saturated fatty acids.

11. The composition of claim 1, wherein the Lewis acid catalyst comprises one or more of an acidic clay, zeolite, aromatic sulfonic acid, zinc, zinc salt, iron, iron salt, aluminum trihalide, boron trihalide and iodine.

12. The composition of claim 1, wherein the mixture further comprises at least about 1 wt % of a borate ester.

13. The composition of claim 12, wherein the borate ester comprises a monoethanolamine ester of boric acid.

14. The composition of claim 12, wherein the composition further comprises boric acid and/or sodium octaborate.

15. The composition of claim 1, wherein the composition is a substantially homogenous solution at a temperature of 15° C. to 35° C. for up to one month.

16. The composition of claim 1, wherein the mixture is reacted in the presence of the Lewis acid catalyst at an increased pressure of greater than 1 atm (101.325 kPa) and/or a reduced pressure of less than 1 atm.

17. A method of treating wood, comprising the steps of:
a) immersing the wood in the treatment solution comprising the composition of claim 1; and
b) pressure impregnating the immersed wood above 1 atm (101.325 kPa).

18. The method of claim 17, further comprising c) separating the wood from the treatment solution after the pressure impregnation; d) exposing the wood to an expansion bath; and e) exposing the wood to a vacuum below 1 atm after completion of the expansion bath.

19. Wood treated according to the method of claim 17.

20. Wood coated with or immersed in a composition according to claim 1.

21. A wood treatment composition produced by reacting a mixture comprising:
i) at least about 40 wt. % creosote;
ii) about 1 to 10 wt. % of an ester component, which comprises $C_1$-$C_6$ alkyl esters of $C_{10}$-$C_{22}$ fatty acids;
iii) about 1 to 15 wt. % of a borate ester; and
optionally, bunker oil;
wherein the mixture is reacted in the presence of a Lewis acid catalyst at a temperature of at least about 150° F. (65° C.); and
the wood treatment composition contains less than 2 wt. % water and has a headspace naphthalene concentration at 70° C. of no more than about 10 $\mu g/m^3$ and an open-cup flashpoint of at least 66° C.; and the composition remains a substantially homogenous solution at a temperature of 15° C. to 35° C. for up to one month.

22. The composition of claim 21, wherein the $C_1$-$C_6$ alkyl esters are methyl and/or ethyl esters; the borate ester comprises $C_2$-$C_6$ alkanolamine ester of boric acid; and the composition further comprises boric acid and/or sodium octaborate.

23. The composition of claim 21, wherein the wood treatment composition comprises at least about 40 wt. % of the bunker oil; at least about 3 wt. % of the ester component; and at least about 3 wt. % of the borate ester, which comprises monoethanolamine ester of boric acid.

24. The composition of claim 21, further comprising boric acid and/or sodium octaborate.

25. The composition of claim 21, wherein the wood treatment composition comprises at least about 85 wt. % creosote; the borate ester comprises monoethanolamine ester of boric acid; and the ester component comprises methyl and/or ethyl esters of $C_{10}$-$C_{22}$ fatty acids.

* * * * *